United States Patent Office 3,186,997
Patented June 1, 1965

3,186,997
1-PHENYL-2-PYRROLIDINO-PENTANE AND SALTS
Ernst Seeger and August Kottler, Biberach an der Riss, Germany, assignors, by mesne assignments, to Boehringer Ingelheim G.m.b.H., Ingelheim (Rhine), Germany, a corporation of Germany
No Drawing. Filed Oct. 18, 1962, Ser. No. 231,543
Claims priority, application Germany, July 1, 1955, T 11,089; Apr. 26, 1956, T 12,153, T 12,154
1 Claim. (Cl. 260—295.5)

This is a continuation-in-part of copending application Serial No. 6,619, filed February 4, 1960, now abandoned, which in turn is a continuation-in-part of application Serial No. 710,186, filed January 21, 1958, now abandoned, which in turn is a continuation-in-part of applications Serial No. 654,455, filed April 23, 1957, now abandoned, Serial No. 654,456, filed April 23, 1957, now abandoned, and Serial No. 630,454, filed December 26, 1956, now abandoned, the latter being in turn a continuation-in-part of application Serial No. 544,385, filed September 21, 1955, now abandoned.

This invention relates to novel tertiary amines having useful pharmacological properties and to their non-toxic, pharmacologically acceptable acid addition salts.

More particularly, the present invention relates to tertiary amines having the structural formula

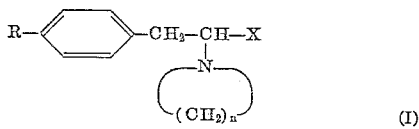

(I)

wherein

R is selected from the group consisting of hydrogen and methyl,

Y is straight or branched alkyl of 3 to 4 carbon atoms, and n is an integer from 4 to 5, inclusive, and their non-toxic, pharmacologically acceptable acid addition salts.

The tertiary amines having the above structural Formula I may be prepared by reacting a β-aryl-α-tertiary-amino-propionitrile of the formula

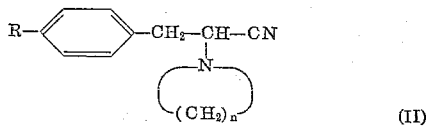

(II)

wherein R and n have the same meanings as in Formula I above, with an alkyl-magnesium-halide of the formula Y—Mg—Hal   (III)

wherein Y has the same meanings as in Formula I above and Hal is a halogen selected from the group consisting of chlorine, bromine and iodine. The reaction of compound II with compound III is advantageously carried out in the presence of a suitable inert organic solvent, such as ether or benzene, or a solvent mixture consisting, for example, of benzene and tetrahydrofuran. The preferred method comprises refluxing the reaction mixture at the boiling point of the particular solvent medium employed at atmospheric pressure, although the reaction will also proceed at moderately elevated temperatures below the boiling point of the solvent and without reflux.

The compounds embraced by Formula I above may also be prepared by reacting an α-piperidyl- or α-pyrrolidyl-alkyl cyanide of the formula

(IV)

wherein Y and n have the same meanings as in Formula I above, with a benzyl-magnesium-halide or a p-methylbenzyl-magnesium-halide of the formula

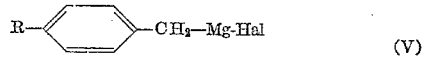

(V)

wherein R and Hal have the same meanings as in Formula I above, in the presence of an inert organic solvent, such as benzene, ether, dibutyl ether or tetrahydrofuran, acidifying the reaction mixture with a dilute acid, preferably hydrochloric acid, to separate it into an organic phase and an aqueous acidic phase, and separating the reaction product from the aqueous acidic phase.

The α-tertiary amino-nitriles II and IV used as starting materials for the preparation of the tertiary amines according to the present invention are readily available or may easily be prepared from the corresponding aldehydes by the method described by Houben-Weyl in "Methoden der Organischen Chemie," 4th edition, vol. 8, pages 279 et seq.

The resulting tertiary amines of the Formula I above may be readily converted into their non-toxic acid addition salts by customary methods, as indicated below.

The following examples will further illustrate the present invention and enable others skilled in the art to understand it more completely. It should be understood, however, that the invention is not limited to these particular examples.

EXAMPLE I

*1-phenyl-2-piperidino-pentane*

A suspension of 48 gm. magnesium powder in 800 cc. of a mixture of benzene and tetrahydrofuran (1:1) was added dropwise to 260 gm. benzyl chloride while agitating the mixture and maintaining it at a temperature of about 30° C. After all of the magnesium suspension had been added and the Grignard reagent had formed, stirring was continued and a solution of 166 gm. α-piperidino-n-valeronitrile (boiling point at 10 mm. Hg =107° C. in 300 cc. of a mixture of benzene and tetrahydrofuran (1:1) was added to the Grignard reagent at a sufficiently slow rate so as not to cause the temperature of the mixture to rise above 40° C. The reaction mixture was then heated for three hours at 40° C. while continuing the agitation. Thereafter, agitation was continued for several hours at room temperature to permit the reaction to go to completion. The bulk of the benzene-tetrahydrofuran solvent was then removed by evaporation in vacuo. Subsequently, ice was added to the evaporation residue, it was slightly acidified with hydrochloric acid and 700 cc. benzene were added. The mixture was separated into an aqueous phase and a benzene phase. The phases were separated and the benzene phase was shaken twice with hydrochloric acid. The acidic solutions were combined again and ammonia was added, whereby a liquid phase separated out which was separated and taken up in benzene. The benzene was evaporated by distillation, yielding 175 gm. of a compound of the formula

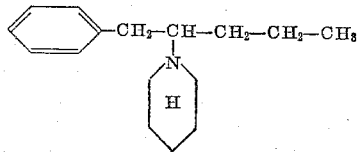

having a boiling point of 108° C. at 0.4 mm. Hg. The product was a colorless liquid.

The tertiary amine was converted into its hydrochloric acid addition salt by precipitating it from solution wth ethereal hydrochloric acid. The hydrochloride was obtained in the form of colorless crystals having a melting point of 166–167° C.

EXAMPLE II

1-phenyl-2-piperidino-hexane

Following the procedure described in Example I, but using 32 gm. α-piperidino-capronitrile (boiling point at 14 mm. Hg=126–128° C.) instead of α-piperidino-pentene-(2)-nitrile, the compound of the formula

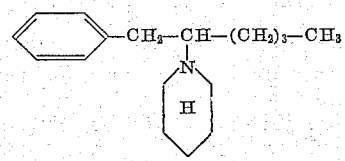

having a boiling point of 117–118° C. at 0.5 mm. Hg was obtained with a yield of 82% of theory, based on the amount of nitrile starting material.

The hydrochloride of this tertiary amine, prepared in accordance with the method described in Example I, had a melting point of 155–156° C.

EXAMPLE III

1-(p-methyl-phenyl)-2-piperidino-pentane

A solution of 17 gm. α-piperidino-valeronitrile in ether was added to a Grignard reagent prepared by adding 4.8 gm. magnesium powder and 37 gm. p-xylyl bromide to anhydrous ether, accompanied by stirring. The resulting mixture was refluxed at moderately elevated temperatures for two hours and was thereafter decomposed into the separate phases by adding ice and a sufficient amount of hydrochloric acid to make it react acidic. The ethereal phase was separated and discarded, while the aqueous acidic phase was made alkaline with ammonia. A liquid separated out which was taken up in ether. The ether extract was evaporated to drive off the ether and the evaporation residue was distilled in vacuo. 19.5 gm. of the compound of the formula

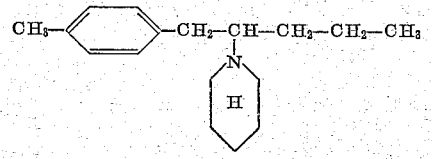

having a boiling point of 114–116° C. at 0.4 mm. Hg were obtained in the form of a colorless liquid.

The hydrochloride of this tertiary amine, obtained in accordance with the method described in Example I, had a melting point of 183° C. after recrystallization from acetone.

EXAMPLE IV

1-phenyl-2-piperidino-pentane-hydrochloride 70 gm. 1-phenyl-2-piperidino-pentane, obtained according to Example I, were dissolved in 300 cc. distilled benzene. Hydrogen chloride gas was bubbled through the benzene solution thus obtained until the solution exhibited a slightly acidic reaction. The acidic solution was then allowed to stand in the refrigerator for about ten hours. The crystals which precipitated from the solution during this period were filtered off on a vacuum filter and the filter cake was recrystallized from acetone. 70 gm. of the hydrochloric acid addition salt of 1-phenyl-2-piperidino-pentane having a melting point of 166° C. were obtained.

EXAMPLE V

1-(p-methyl-phenyl)-2-piperidino-pentane-sulfate 19 gm. 1-(p-methyl-phenyl)-2-piperidino-pentane, obtained according to Example III, were dissolved in 100 cc. ether, and then 3.6 gm. 98% sulfuric acid were gradually added to the ether solution while stirring it. An oily substance separated out. The mixture was allowed to stand in a refrigerator for a short period of time during which the oily precipitate crystallized. The crystals were separated by filtration and recrystallized from isopropanol. 18 gm. of the colorless sulfuric acid addition salt of 1-(p-methyl-phenyl)-2-piperidino-pentane having a melting point of 178° C. were obtained.

EXAMPLE VI

1-phenyl-2-pyrrolidino-3-methyl-butane

A Grignard reagent was prepared by adding 4.6 gm. magnesium powder to 25.2 gm. benzyl chloride dissolved in absolute ether. A solution of 15.2 gm. α-pyrrolidino-isovaleronitrile (boiling point at 23 mm. Hg=103–104° C.) in 30 cc. absolute ether was added to the Grignard reagent dropwise, while continuously stirring. The resulting mixture was refluxed at moderate temperatures for 1½ hours while continuing the agitation. Thereafter, the reaction mixture was cooled, ice was added, and it was made acidic by adding dilute hydrochloric acid. An etheral phase and an aqueous acidic phase were formed thereby. The ethereal phase was separated and discarded, while the aqueous acidic phase was made alkaline with ammonia. An oily substance separated out which was extracted with ether. The ether extract was dried over sodium sulfate and was then heated to drive off the ether solvent. The oily residue was distilled in a vacuum. 17 gm. of the compound of the formula

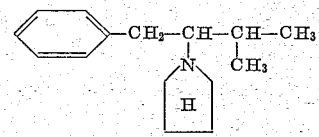

having a boiling point of 88° C. at 0.2 mm. Hg were obtained in the form of a colorless liquid.

The tertiary amine thus obtained was converted into its hydrochloride by dissolving the amine in ether and adding an etheral solution of hydrochloric acid thereto. The colorless hydrochloride had a melting point of 163° C.

EXAMPLE VII

1-phenyl-2-pyrrolidino-pentane 390 gm. benzyl chloride were added dropwise to 400 cc. of a mixture consisting of 72 gm. magnesium powder and equal parts of benzene and tetrahydrofuran. During the addition of the benzyl chloride, care was taken not to allow the temperature to rise above 40° C. The resulting Grignard reagent was diluted with 750 cc. of a mixture of equal parts of benzene and tetrahydrofuran. 228 gm. α-pyrrolidino-valeronitrile, dissolved in a mixture of benzene and tetrahydrofuran, were added dropwise to the Grignard solution, taking care that the temperature of the reaction mixture did not rise above 40° C. After all of the valeronitrile solution had been added, the resulting mixture was first stirred for three hours at 40° C. and then for some additional time at room temperature. The majority of the benzene-tetrahydrofuran solvent was then removed by vacuum distillation and the distillation residue was divided into two phases by adding ice and hydrochloric acid until it reacted acidic. 1 liter of benzene was added to the two-phase system. The aqueous acidic phase was separated and the benzene phase was shaken twice with dilute hydrochloric acid. The aqueous hydrochloric acid solutions were combined and made alkaline with ammonia. An oily substance separated out which was extracted with benzene. The benzene extract was evaporated to drive off the benzene and the residue was distilled in vacuo. 275 gm. of the compound of the formula

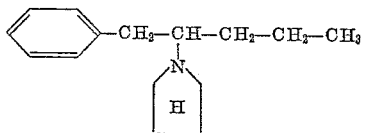

having a boiling point of 90–92° C. at 0.3 mm. Hg were obtained.

The colorless crystalline hydrochloride of this amine had a melting point of 134–135° C.

EXAMPLE VIII

1-phenyl-2-pyrrolidino-hexane

Following the procedure described in Example VI, but using 16.6 gm. α-pyrrolidino-capronitrile (boiling point at 15 mm. Hg=111–113° C.) in place of α-pyrrolidino-isovaleronitrile, 17 gm. of the compound of the formula

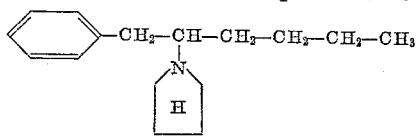

having a boiling point of 108–110° C. at 0.6 mm. Hg were obtained.

EXAMPLE IX

1-phenyl-2-pyrrolidino-4-methyl-pentane

Following the procedure described in Example VI, but using 16.6 gm. α-pyrrolidino-isocapronitrile (boiling point at 15 mm. Hg=109–110° C.) in place of α-pyrrolidino-isovaleronitrile, 17 gm. of the compound of the formula

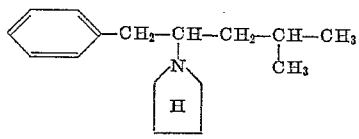

having a boiling point of 101° C. at 0.5 mm. Hg were obtained.

The hydrochloride of this tertiary amine had a melting point of 125–126° C.

EXAMPLE X

1-(p-methyl-phenyl)-2-pyrrolidino-pentane

Following the procedure described in Example VI, but using 4.6 gm. magnesium powder, 37 gm. p-xylyl bromide and 15 gm. α-pyrrolidino-valeronitrile, 17 gm. of the compound of the formula

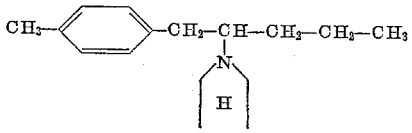

having a boiling point of 108–110° C. at 0.45 mm. Hg were obtained in the form of a colorless liquid.

EXAMPLE XI

1-phenyl-2-pyrrolidino-pentane sulfate 2.5 gm. 98% sulfuric acid were added to a mixture of 10.5 gm. 1-phenyl-2-pyrrolidino-pentane, obtained in accordance with Example VII, and 75 cc. ether, while stirring and cooling the mixture. An oily substance precipitated out which solidified after standing for some time at room temperature. For purposes of purification, the solidified oil was recrystallized from acetone. The sulfuric acid addition salt of 1-phenyl-pyrrolidino-pentane was thus obtained in the form of colorless crystals having a melting point of 102° C.

EXAMPLE XII

1-phenyl-2-pyrrolidino-pentane citrate

A solution of 0.6 gm. citric acid in 50 cc. isopropanol was added to a mixture of 10.5 gm. 1-phenyl-2-pyrrolidino-pentane and 30 cc. isopropanol. The resulting mixture was heated to 40° C. for ten minutes. Thereafter, it was cooled and 200 cc. ether were added. The mixture was allowed to stand in a refrigerator, whereby a solid precipitated out which was recrystallized from methyl ethyl ketone. 19 gm. of the citric acid addition salt of 1-phenyl-2-pyrrolidino-pentane were obtained in the form of colorless crystals.

EXAMPLE XIII

1-phenyl-2-pyrrolidino-pentane hydrochloride

Hydrogen chloride gas was bubbled through a solution of 20 gm. 1-phenyl-2-pyrrolidino-pentane in 50 cc. benzene, accompanied by stirring, until the solution was slightly acidic. Thereafter, the acidic solution was allowed to stand for a few hours, whereby a precipitate formed. The precipitate was filtered off on a vacuum filter and the filter cake was recrystallized from acetone. 17 gm. of the hydrochloric acid addition salt of 1-phenyl-2-pyrrolidino-pentane having a melting point of 135° C. were obtained in the form of colorless crystals.

The following table illustrates additional tertiary amines according to the present invention which were prepared and lists the melting and/or boiling points, the melting point of the corresponding hydrochloride addition salt, the nitrile and Grignard reagents used and the yield in each case.

| Ex. No. | Tertiary Amine Produced | B.P., °C./mm. Hg | M.P. of Hydrochloride, °C. | Acetonitrile Reagent | Grignard Reagent from magnesium and | Yield percent of theory |
|---|---|---|---|---|---|---|
| 23 | 1-phenyl-2-pyrrolidino-pentane. | 105/0.5 | 134–135 | 2-phenyl-1-pyrrolidino-propionitrile. | n-Propyl-bromide | 78 |
| 24 | 1-phenyl-2-piperidino-pentane. | 100–101/0.2 | 163–164 | 2-phenyl-1-piperidino-propionitrile. | do | 70 |
| 25 | 1-phenyl-2-pyrrolidino-hexane. | 108–110/0.6 | | 2-phenyl-1-pyrrolidino-propionitrile. | n-Butyl-bromide | 74 |
| 26 | 1-phenyl-2-pyrrolidino-3-methyl-butane. | 88/0.2 | | do | Isopropyl bromide | 71 |

As previously stated and illustrated in the preceding examples, the tertiary amines according to the present invention form non-toxic, pharmacologically useful acid addition salts. It is well known in the pharmacolgical and therapeutic arts that the non-toxic acid addition salts of basic pharmacologically active substances do not materially differ from the basic substances themselves in their pharmacological activities. The acid addition salts merely provide a desirable solubility factor. So it is with the present tertiary amines.

Typical examples of pharmacologically useful and acceptable non-toxic acid addition salts of the present tertiary amines are those formed with hydrochloric acid, hydrobromic acid, sulfuric acid, phosphoric acid, nitric acid, acetic acid, propionic acid, butyric acid, valeric acid, oxalic acid, malonic acid, succinic acid, maleic acid, fumaric acid, lactic acid, tartaric acid, citric acid, malic acid, benzoic acid, phthalic acid, cinnamic acid, salicylic acid, nicotinic acid, 2-furoic acid and the like. The particular acid addition salts illustrated in the examples, however, have been found to be particularly suitable for practical purposes.

The compounds embraced by Formula I above and their non-toxic acid addition salts are useful and effective pharmacological agents. More particularly, they exhibit a stimulating effect upon the central nervous system and analeptic as well as papaverine-like myotropic spasmolytic and hypertensive activities.

While we have illustrated the present invention with the aid of certain specific embodiments thereof, it will be readily apparent to those skilled in the art that the invention is not limited to these embodiments, and that various changes and modifications may be made without departing from the spirit of the invention or the scope of the appended claim.

We claim:

A compound selected from the group consisting of 1-phenyl-2-pyrrolidino-pentane and its non-toxic pharmacologically acceptable acid addition salts.

References Cited by the Examiner

UNITED STATES PATENTS

| | | | |
|---|---|---|---|
| 2,683,742 | 7/54 | Cusic | 260—313 |
| 2,711,428 | 6/55 | Goodson et al. | 260—293 |
| 2,824,111 | 2/58 | Heinzelman | 260—293 |

FOREIGN PATENTS

| | | |
|---|---|---|
| 191,869 | 9/57 | Austria. |
| 627,139 | 7/49 | Great Britain. |

OTHER REFERENCES

Beilstein's Handbuch der Organischen Chemie, vol. 20, Second Supplement (1953), page 16, System No. [3038].

Heinzelman et al.: Journal of the American Chemical Society, vol. 75, page 3410 (1953).

Heinzelman et al.: Journal of the American Chemical Society, vol. 75, pages 3409 and 3411–3413 added, 1953.

Kadatz et al.: Arzneimittel Forschung, vol. 6; page 345 (1957).

Stevens: Journal of the Chemical Society (1931), page 2568.

WALTER A. MODANCE, *Primary Examiner.*

IRVING MARCUS, *Examiner.*

UNITED STATES PATENT OFFICE
CERTIFICATE OF CORRECTION

Patent No. 3,186,997 June 1, 1965

Ernst Seeger et al.

It is hereby certified that error appears in the above numbered patent requiring correction and that the said Letters Patent should read as corrected below.

Column 1, lines 30 to 34, right-hand portion of the formula, for "—X" read -- —Y --; line 62, for "bromne" read -- bromine --; column 2, lines 3 to 7, right-hand portion of the formula, for "—X" read -- —Y --; line 47, after "107° C." insert a closing parenthesis.

Signed and sealed this 23rd day of November 1965.

(SEAL)
Attest:

ERNEST W. SWIDER
Attesting Officer

EDWARD J. BRENNER
Commissioner of Patents